United States Patent Office 3,158,594
Patented Nov. 24, 1964

3,158,594
POLYMER PROCESS AND CATALYST
Roger Michel Weil, New York, N.Y., and Frederick C. Foster, Verona, N.J., assignors to W. R. Grace & Co., Clarksville, Md., a corporation of Connecticut
No Drawing. Filed Nov. 20, 1959, Ser. No. 854,242
6 Claims. (Cl. 260—94.9)

This invention is directed (a) to the synthesis of polyethylene having a density in the range of 0.94–0.95 by heating ethylene under superatmospheric pressure in the presence of a catalyst prepared by subjecting activated supported chromia, i.e., chromic acid anhydride ($CrO_3$) on silica-alumina activated by fluidizing in air at a temperature of at least 1200° F., preferably about 1350° F., to the action of a tri (lower) alkyl aluminum; (b) to the process of making the catalyst; and (c) to the catalyst as a new composition of matter.

There are several prior art processes related to the instant invention:

(1) It is known to prepare olefins ranging from butene up to low density, low-melting polyethylene waxes by polymerizing ethylene using a trialkyl aluminum as the sole catalyst. (See U.S. Patent 2,699,457, Ziegler et al.)

(2) It is known to prepare high density (0.96), high-melting (136–138° C.) polyethylene using as a catalyst the product prepared by depositing an aqueous solution of $CrO_3$ on silica-alumina, followed by drying and activation by fluidizing in hot air for several hours. (See U.S. Patent 2,825,721 of March 4, 1958, assigned to Phillips Petroleum Company.)

(3) It is known to make polyethylene by heating ethylene under pressure in an autoclave containing $Cr_2O_3$ on activated (gamma) alumina, benzene, and triethyl aluminum. See Example 2 in U.S. Patent 2,824,089 to Standard Oil Company of Indiana in which example the mole ratio triethyl aluminum:Cr is 0.5:1. The polyethylene is said to be extremely high molecular weight material, insoluble in boiling xylene.

(4) It is known to make polypropylene using as the catalyst a trialkyl aluminum and $CrO_3$ on silica-alumina fluidized in air at 932–1112° F. (Natta et al., La Chimica e l'Industria, 38, 124–127.)

So far as is known, however, there is no reported catalyst prepared by adding a trialkyl aluminum to $CrO_3$ supported on silica-alumina activated by fluidizing in air at temperatures as high as 1200° F., nor are we aware of such catalyst used in olefin polymerization. When the term "activated supported chromia" or "supported activated chromia," or the like is used herein it means chromic acid anhydride($CrO_3$) supported on, or formed in situ on, a silica-alumina base of the type described in U.S. Patent 2,825,721 referred to above.

The medium-density polyethylene of this invention is similar in physical properties and uses to medium-density polyethylenes of the prior art and can be used, e.g., in making pipe, film, filament, tubing, and molded and extruded articles, and the like. It has an advantage over 0.96 density polyethylene (made with the activated supported chromia catalyst of U.S. Patent 2,825,721) in that the medium density material can more often be used in shaping equipment designed for low density polyethylene. It is particularly suitable for use in injection molding, using molds in commercial use with conventional low density (0.92) polyethylenes, and in wire coating, which latter applications generally require polyethylene with a density of 0.945.

For a 0.947 density product made by the process of this invention, the following are typical physical properties: melt index, 0.78; melt viscosity (poises), $3\times10^5$; inherent viscosity, 1.37; percent soluble in toluene at 22° C., 10.4; percent ash, 0.72; Young's modulus, 48,900; tensile strength, 3,400 p.s.i.; percent elongation, 50; impact strength, 0.75.

This invention solves cheaply and efficiently a long-standing problem: how to produce medium density polyethylene in a polyethylene plant designed to produce 0.96 density material by a solution type process. Another advantage of this new catalyst is that it gives a higher yield of polyethylene than the untreated (i.e., not treated with trialkyl aluminum) activated supported chromia catalyst. Further, the "threshhold" of the new catalyst is much lower than that of the untreated activated supported chromia catalyst; e.g., in a reactor requiring "x" grams of activated supported chromia catalyst to start polymerization, x/6 grams of the new catalyst is generally operable to start polymerization.

The term "density" as used herein means the weight of a given volume of polyethylene measured at 27° C. divided by the weight of the same volume of water measured at 4° C.

When the term medium density is used, it is to be understood that the density is 0.94–0.95.

PREPARATION OF ACTIVATED SUPPORTED CHROMIA

The supported and activated chromia is a well-known polyethylene catalyst per se and is used commercially in the United States in the synthesis of 0.96 density polyethylene by the process described in the above cited U.S. Patent 2,825,721 to Phillips Petroleum Company. It is prepared commercially by the process given in that patent. See also Industrial and Engineering Chemistry, vol. 48, No. 7, p. 1152 (1956). It generally contains about 1–2.5% Cr as $CrO_3$ supported on silica-alumina. The silica:alumina mole ratio is about 90:10. If desired, the chromia may be formed in situ on the silica-alumina by in situ pyrolysis of a chromic salt, e.g., chromic nitrate, followed by activation by fluidizing in hot air to ensure that a substantial amount of the chromium oxide is in the hexavalent state, i.e., is present as chromic acid anhydride. After the chromia is deposited on the support, the supported chromia is activated by fluidizing in a stream of air at a temperature of at least 1200° F., e.g., 1350° F., for several hours, e.g., 5 hours. The supported and activated chromia catalyst is then ready for treatment with a trialkyl aluminum for use in this invention.

The silica-alumina base used as the hexavalent chromia support is the well-known activated silica-alumina petroleum cracking catalyst. The processes for making it have been known for years to those skilled in the art.

BATCH POLYETHYLENE SYNTHESIS

*Example 1*

The synthesis vessel used was a 1-liter stainless steel autoclave equipped with stirrer, thermowell, rupture disc, a ball valve serving as catalyst inlet, and an inlet for charging solvent and gases. First, the autoclave was flushed with nitrogen, and then 0.6 g. of supported chromia (activated by fluidization in air at 1350° F. as above described) was placed in the autoclave while maintaining the nitrogen atmosphere, followed by 385 ml. of cyclohexane solvent. Twenty-five cc. of solvent was then boiled off to reduce further any moisture in the system. Then 6 cc. of a 0.1 molar solution of tri-isobutyl aluminum (0.12 g. tri-isobutyl aluminum) in cyclohexane was added, the stirrer was turned on, and the autoclave was heated to 280° F. Then the autoclave was connected to an ethylene tank and pressured with ethylene at 250 p.s.i.g. The reaction temperature was maintained at 300± 10° F. and the pressure was maintained at 250 p.s.i.g. by continuously repressuring with ethylene. The polymerization was run for 2 hours, after which the autoclave was vented and the polyethylene (170 g.) was removed. The amount of impurity did not exceed the amount of total catalyst (0.72 g.). Using the well-known formula, g. polymer/g. catalyst/hour, the catalyst reactivity therefore was 169/0.72/2=117.

If desired, the crude material can be purified by various techniques well-known to those skilled in the art. For example, the material may be filtered hot, or centrifuged, whereby catalyst residues and metallic impurities are removed.

The purified product (of Example 1) was a white solid, density 0.943. Some of the product was pressed between plates to give film of satisfactory transparency.

*Example 2*

Although a solvent is preferred in carrying out the polymerization reaction, it is not absolutely necessary. Using the apparatus of Example 1, 0.5 g. of "dry" catalyst prepared by treating activated supported chromia with tri isobutyl aluminum as in Example 1, followed by filtering off the cyclohexane solvent, was mixed with 10 g. of polyethylene (made by a procedure analogous to that of Example 1) to disperse it, and the mixture was placed in the autoclave under nitrogen. The autoclave was heated to 230° F. and then pressured with ethylene to 450 p.s.i. The reaction was continued for 2 hours. A crude, somewhat discolored, solid polyethylene product was formed in fair yield and was purified by filtering and drying to give a white solid product of 0.945 density.

*Example 3*

In this example polyethylene was made at substantially room temperature and at atmospheric pressure. The apparatus used was a three-necked round bottom flask equipped with thermometer, stirrer, and inlet for ethylene and nitrogen. The vessel was initially flushed with nitrogen, then a freshly prepared mixture of 10 g. $CrO_3$ supported activated catalyst and 1.71 g. of triethylaluminum diluted in 200 cc. dry cyclohexane (alkyl aluminum to chromium mole ratio: 3:1) was introduced into the polymerization flask. The stirrer was then turned on, and the ethylene addition was begun. Ethylene was passed through the reaction liquid at a rate of about 50 ccs. per minute. The run was continued over a period of 6 hours. A mild exotherm was noticeable. Initially, the reaction slurry was a deep green. As the polymerization proceeded, the catalyst particles appeared to grow in size. Actually, the increase in particle size was due to formation of a coating of polyethylene on the individual particles of catalyst. At the end of the run the product was worked up as in the preceding examples. A good yield of medium-density polyethylene was obtained.

*Example 4*

The procedure of Example 1 was followed substantially as there stated, except that the $CrO_3$-silica-alumina composite was fluidized in air at 1200° C. instead of 1350°. Triethylaluminum was used (instead of tri-isobutyl aluminum). The triethylaluminum:Cr mole ratio was 3:1; the polymerization pressure 450 p.s.i.g.; the temperature 302° F., residence time about 1 hour. Reactivity of the catalyst was 206. The density of the polyethylene product was 0.950.

CONTINUOUS POLYETHYLENE SYNTHESIS

The runs in Table I, following, were made in a continuous unit comprising a 1-gallon stainless steel autoclave provided with both internal and external oil-carrying heating coils, stirrer, ethylene inlet line, solvent (cyclohexane) inlet line, a solvent heater, and product overflow line going to filters and solvent flash tank. Incoming ethylene, solvent, alkyl aluminum, and activated supported chromia (fluidized in air at 1350° F.) were regulated to provide a residence time in the autoclave of about 1–3 hours, preferably about 1.5 hours. The tri(lower) alkyl aluminum (in these examples, triethyl aluminum, typically 0.1 molar in cyclohexane) was added under nitrogen pressure to the solvent line and thereafter the activated supported chromia catalyst component was added through a star valve to the same solvent line. The solvent was heated to (typically) 220° F. before entering the autoclave.

A suitable temperature range is 280–330° F. using a pressure in the range of 300–450 p.s.i.g. when using the continuous reactor.

Antioxidant may be added if desired to the overflow line before the product slurry goes to the filters. The ethylene flash tank is preferably maintained under pressure, which pressure is generally about 150 p.s.i. lower. The design of this continuous unit is conventional and is well-known to those skilled in the polyethylene art.

TABLE 1

| Ex. No. | Activated supported chromia, gms. per hr. used | Moles triethyl Al added per mole Cr in activated supported chromia | Pressure, p.s.i.g. | Temp., °F. | Density | Melt Index |
|---|---|---|---|---|---|---|
| 5 | 3.0 | 2.0 | 450 | 318 | 0.948 | 1.70 |
| 6 | 4.0 | 2.2 | 450 | 327 | 0.943 | 5.70 |
| 7 | 3.0 | 3.0 | 450 | 320 | 0.946 | 2.30 |
| 8 | 3.7 | 2.5 | 300 | 310 | 0.945 | 0.19 |

The following comments apply generally both to batch and continuous operation. A simple and effective way to prepare the catalyst is to bring together under an inert atmosphere the activated supported chromia and a solution of the trialkyl aluminum in an inert solvent. The reaction takes place immediately at room temperature. Often the absorption and/or the reaction of the trialkyl aluminum on or with the activated supported chromia is so rapid and so complete that the solvent gives a negative test for trialkyl aluminum shortly after mixing. The catalyst slurry is then ready for use, and, for best results, should be used immediately after mixing.

The amount of trialkyl aluminum to be applied to the activated supported chromia, while operable over a fairly wide range as a "density reducer" should be chosen with the properties of the desired polymer in mind. As a generality it appears that the greater the ratio of trialkyl aluminum to chromium, the lower the density of the resultant polymer up to an Al:Cr ratio of 3.8:1. The effect of the trialkylaluminum on density becomes appreciable at trialkyl aluminum:Cr ratios of the order of about 1:1. On the other hand, increasing the trialkyl aluminum:Cr ratio from a range of 4:1 to a range of 8:1, while operable, apparently is not accompanied by a proportionate drop in density. In general, the use of a trialkyl aluminum range of 0.1–3:1 increases the yield of polymer, as compared to the use of trialkyl aluminum:Cr ratios outside this range.

The herein examples show the use of $AlR_3$ where R is ethyl or isobutyl. Actually, R can be any lower alkyl radical, i.e., $C_nH_{2n+1}$, in which $n$ is an integer from 1 to 8 inclusive. The tri(lower)alkyl aluminums are well-known to those skilled in the art and include trimethylaluminum, tripropylaluminum, triisopropylaluminum, tributyl aluminum, triamylaluminum, trihexylaluminum, triheptylaluminum, trioctylaluminum, triisooctylaluminum, and the like.

If desired, $AlR_3$ (R being lower alkyl) may be brought into vapor phase contact with the activated supported chromia catalyst to give a modified catalyst suitable for use in this invention. In this embodiment ethylene is bubbled through a graduated flask of liquid $AlR_3$ and the vapor stream (containing a small concentration of $AlR_3$) is used to fluidize a bed of activated supported chromia catalyst of known weight and known Cr content. Fluidization is continued until a predetermined volume of $AlR_3$ is absorbed on the fluidized catalyst, so that the desired $AlR_3$:Cr ratio is easily attained. This embodiment often requires overnight operation, since it is preferably carried out at temperatures not substantially in excess of room temperature (at which the vapor pressures of the AlR₃ may be somewhat low) to minimize thermal decomposition of the AlR₃.

Cyclohexane has been mentioned as a suitable solvent for the aluminum trialkyl. Actually, a number of good solvents are available, e.g., pentane, hexane, heptane, octane, benzene, xylene, toluene, and the like. Many of these solvents are also well-known polyethylene solvents. However, it is by no means necessary that the solvent be one that is compatible with ethylene or polyethylene, since the solvent may, if desired, be removed from the catalyst before the catalyst is added to the polymerization reactor. The solvent-free catalyst can be used to make polyethylene by substantially the same procedures used with the activated supported chromia itself. These latter procedures are well-known and are set forth, for example, in U.S. Patent 2,825,721 supra.

In general, the herein polymerization process is operable at pressures of atmospheric 1000 p.s.i., and even higher, and at temperatures of about 80°–425° F. For efficiency and overall ease of operation the preferred pressure range is 100–450 p.s.i. and the preferred temperature range is 200–395° F. In general, an increase in pressure causes an increase in density, a decrease in melt index, and an increase in yield; an increase in temperature causes a slight decrease in density, an increase in melt index, and a decrease in yield.

The residence time is not critical. The formation of medium density polymer begins as soon as reaction temperatures and pressures are reached within the vessel. In batch operations the attainment of reaction conditions is of course determined by the specifications (e.g., wall thickness) of the apparatus used. For continuous operation the residence time at temperatures and pressures is suitably adjusted to provide a reaction product effluent containing about 10% "solids" (counting dissolved polyethylene as a "solid"). Such residence time is typically 1–3 hours.

The amount of catalyst is not critical; 0.2 to 2 g. catalyst per 100 grams of ethylene polymerized is suitable, but amounts considerably larger or smaller are operable, typically 0.1 to 10 g. of catalyst per 100 grams of polymer.

This application is a continuation-in-part of our copending application Serial Number 784,060, filed December 31, 1958, now abandoned.

We claim:

1. The method of preparing polyethylene having a density in the range of 0.94–0.95 that comprises contacting, at a temperature of from about 200° F. to about 395° F., ethylene in an inert hydrocarbon diluent with a catalyst prepared by adding, as the sole essential catalyst components, a tri lower alkyl aluminum to chromia, $CrO_3$, supported on silicia-alumina and activated by fluidizing the supported chromia in an air at a temperature of 1200–1350° F.

2. The method according to claim 1 in which the polymerization pressure is in the range 300–450 p.s.i.g.

3. The method according to claim 1 in which the polymerization temperature is in the range of 280–330° F.

4. The method according to claim 1 in which the number of moles of aluminum tri lower alkyl added per mole of Cr in the activated supported chromia is 1–3.8:1.

5. The method according to claim 1 in which the tri lower alkyl aluminum is triethylaluminum.

6. The method according to claim 1 in which the ethylene is subjected to the action of the catalyst for a residence time of 1–3 hours.

References Cited by the Examiner
UNITED STATES PATENTS

| | | | |
|---|---|---|---|
| 2,825,721 | 3/58 | Hogan et al. | 260—93.7 |
| 2,944,049 | 7/60 | Edmonds | 260—88.2 |

OTHER REFERENCES

Natta et al.: La Chimica e l' Industria, vol. 38, No. 2 (1956), pages 124–127, page 124 only needed.

Gaylord et al.: Linear and Stereoregular Addition Polymers, Interscience Publishers Inc., New York, N.Y. (1959), pages 319 and 320.

JOSEPH L. SCHOFER, *Primary Examiner.*

L. H. GASTON, *Examiner.*